US012809217B2

(12) United States Patent
Imai

(10) Patent No.: US 12,809,217 B2
(45) Date of Patent: Nov. 24, 2026

(54) LIGHTING DEVICE AND DRIVING METHOD THEREOF

(71) Applicant: Japan Display Inc., Tokyo (JP)

(72) Inventor: Takayuki Imai, Tokyo (JP)

(73) Assignee: Japan Display Inc., Tokyo (JP)

( * ) Notice: Subject to any disclaimer, the term of this patent is extended or adjusted under 35 U.S.C. 154(b) by 133 days.

(21) Appl. No.: 19/077,509

(22) Filed: Mar. 12, 2025

(65) Prior Publication Data

US 2025/0208469 A1 Jun. 26, 2025

Related U.S. Application Data

(63) Continuation of application No. PCT/JP2023/032665, filed on Sep. 7, 2023.

(30) Foreign Application Priority Data

Oct. 25, 2022 (JP) ................................ 2022-170887

(51) Int. Cl.
*G02F 1/1347* (2006.01)
*G02F 1/1343* (2006.01)

(52) U.S. Cl.
CPC ...... *G02F 1/1347* (2013.01); *G02F 1/134309* (2013.01)

(58) Field of Classification Search
CPC ......................... G02F 1/1347; G02F 1/134309
See application file for complete search history.

(56) References Cited

U.S. PATENT DOCUMENTS 11,719,984 B2 * 8/2023 Koito .................. G02F 1/13471 349/138
2010/0149444 A1 * 6/2010 Hikmet ............. G02F 1/134363 349/122

(Continued)

FOREIGN PATENT DOCUMENTS

KR 20130040067 A * 4/2013 ............. H05B 45/37
WO WO-2022176684 A1 * 8/2022 ....... G02F 1/134309

OTHER PUBLICATIONS

Machine translation of KR-20130040067-A (Year: 2026).*

(Continued)

*Primary Examiner* — Michael Pervan
(74) *Attorney, Agent, or Firm* — K&L Gates LLP

(57) ABSTRACT

A lighting device includes a light source, an optical element including at least two liquid crystal cells overlapping with each other over the light source, and a controlling device for controlling the optical element. Each of the liquid crystal cells includes; a plurality of first electrodes and plurality of second electrodes alternately arranged in a stripe shape; a liquid crystal layer over the first electrodes and the second electrodes; and a plurality of third electrodes and plurality of fourth electrodes alternately arranged over the liquid crystal layer and intersecting the first electrodes and the second electrodes. The controlling device is configured to be input with a pulse-width modulated first input signal and second input signal. The controlling device is further configured to convert the first input signal and the second input signal into a pulse-amplitude modulated first output signal and second output signal, respectively, according to duty ratios.

14 Claims, 13 Drawing Sheets

(56) References Cited

U.S. PATENT DOCUMENTS

| | | | | |
|---|---|---|---|---|
| 2011/0234934 | A1* | 9/2011 | Chang | G02F 1/13471 349/74 |
| 2018/0180968 | A1* | 6/2018 | Chin | G02B 3/14 |
| 2018/0196318 | A1* | 7/2018 | Presniakov | G02F 1/134363 |
| 2018/0284560 | A1* | 10/2018 | Yata | G02F 1/133526 |
| 2019/0025657 | A1* | 1/2019 | Presniakov | G02F 1/133504 |
| 2019/0094650 | A1* | 3/2019 | Gao | G02F 1/134309 |
| 2019/0129245 | A1* | 5/2019 | Nakanishi | G02F 1/133553 |
| 2019/0204709 | A1* | 7/2019 | Fang | G02F 1/29 |
| 2022/0357614 | A1 | 11/2022 | Koito et al. | |

OTHER PUBLICATIONS

Machine translation of WO-2022176684-A1. (Year: 2026).*

Search report issued in related International Patent Application No. PCT/JP2023/032665, mailed Oct. 17, 2023 and English translation of same. 5 pages.

* cited by examiner

LIGHTING DEVICE AND DRIVING METHOD THEREOF

CROSS-REFERENCE TO RELATED APPLICATIONS

This application is a Continuation of International Patent Application No. PCT/JP2023/032665, filed on Sep. 7, 2023, which claims the benefit of priority to Japanese Patent Application No. 2022-170887, filed on Oct. 25, 2022, the entire contents of which are incorporated herein by reference.

FIELD

An embodiment of the present invention relates to a lighting device and a driving method thereof. For example, an embodiment of the present invention relates to a lighting device capable of controlling light distribution utilizing orientation of liquid crystals and a driving method thereof.

BACKGROUND

Optical elements, so-called liquid crystal lenses, have been known in which a change of a refractive index of a liquid crystal layer by controlling a voltage applied to liquid crystals to control the orientation of the liquid crystals is utilized. Control of the refractive index of the liquid crystal layer in a state where such an optical element is arranged over a light source allows the light from the light source to be diffused, thereby producing a lighting device capable of controlling light distribution (see, Japanese laid-open patent publication No. 2021-117344, for example).

SUMMARY

An embodiment of the present invention is a lighting device. The lighting device includes a light source, an optical element, and a controlling device for controlling the optical element. The optical element is arranged so that light emitted from the light source passes therethrough and includes at least two liquid crystal cells overlapping each other. Each of the at least two liquid crystal cells includes; a plurality of first electrodes and a plurality of second electrodes alternately arranged in a stripe shape; a liquid crystal layer over the plurality of first electrodes and the plurality of second electrodes; and a plurality of third electrodes and a plurality of fourth electrodes alternately arranged over the liquid crystal layer, intersecting the plurality of first electrodes and the plurality of second electrodes, and disposed in a stripe shape. The controlling device is configured to be input with a pulse-width modulated first input signal and second input signal which specify a degree of diffusion of the light caused by the optical element in an extending direction of the plurality of first electrodes and an extending direction of the plurality of third electrodes. The controlling device is further configured to convert the first input signal and the second input signal into a pulse-amplitude modulated first output signal and second output signal, respectively, according to duty ratios of the first input signal and the second input signal and to supply the first output signal and second output signal to the optical element.

An embodiment of the present invention is a driving method of a lighting device. The lighting device includes a light source, an optical element, and a controlling device for controlling the optical element. The optical element is arranged so that light emitted from the light source passes therethrough and includes at least two liquid crystal cells overlapping each other. Each of the at least two liquid crystal cells includes; a plurality of first electrodes and a plurality of second electrodes alternately arranged in a stripe shape; a liquid crystal layer over the plurality of first electrodes and the plurality of second electrodes; and a plurality of third electrodes and a plurality of fourth electrodes alternately arranged over the liquid crystal layer, intersecting the plurality of first electrodes and the plurality of second electrodes, and disposed in a stripe shape. The driving method includes; inputting a pulse-width modulated first input signal and second input signal to the controlling device, the first input signal and the second input signal specifying a degree of diffusion of the light caused by the optical element in an extending direction of the plurality of first electrodes and an extending direction of the plurality of third electrodes; and converting the first input signal and the second input signal into a pulse-amplitude modulated first output signal and second output signal, respectively, according to duty ratios of the first input signal and the second input signal and supplying the first output signal and second output signal to the optical element.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, the drawings are only an example, and do not limit the interpretation of the invention. In the specification and the drawings, the same reference number is provided to an element that is the same as that which appears in preceding drawings, and a detailed explanation may be omitted as appropriate. The reference number is used when plural structures which are the same as or similar to each other are collectively represented, while a hyphen and a natural number are further used when these structures are independently represented.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and claims, an expression that two structures "orthogonally intersect" includes not only a state where these two structures orthogonally (90°) intersect but also a state where they intersect at an angle of 90°±10°. An expression that two structures are "parallel" includes a state where extending directions of these two structures are at an angle of 0°±10°.

Hereinafter, a lighting device 100 and its driving method according to an embodiment of the present invention are explained.

1. Structure of Lighting Device

Figure 1:
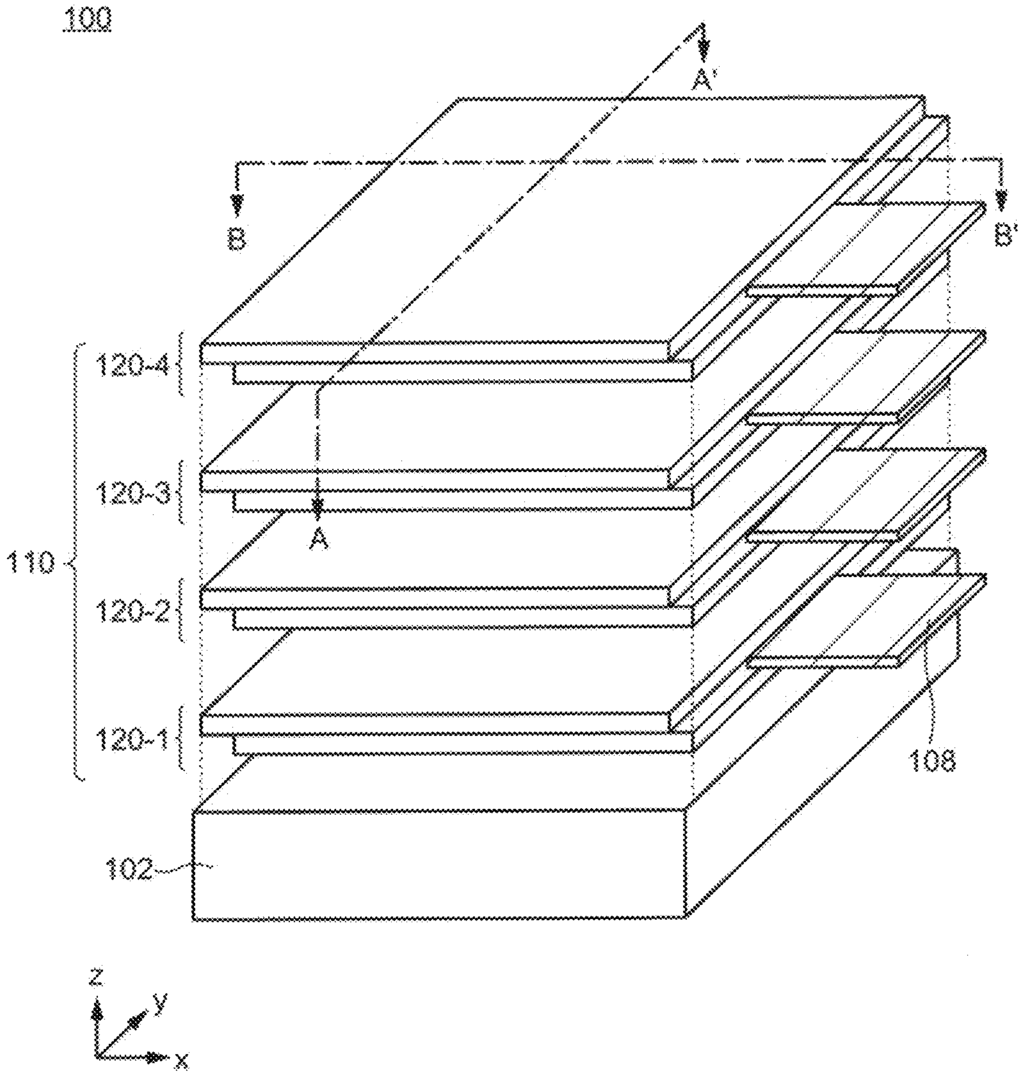
FIG. 1 is a schematic perspective view of a lighting device according to an embodiment of the present invention.

FIG. 1 is a schematic perspective view of the lighting device 100 according to an embodiment of the present invention. As shown in FIG. 1, the lighting device 100 includes a controlling device, which is not illustrated in FIG. 1, in addition to an optical element 110 and a light source 102. The lighting device 100 may further include an input device (not depicted in FIG. 1) for outputting signals to control the optical element 110 and inputting them to the controlling device 150. The input device may further be configured to be able to control the intensity of the light from the light source 102 via the controlling device or directly.

The light source 102 is configured and arranged to emit light to the optical element 110. There are no restrictions on the light-emitting elements included in the light source 102, and light emitting diodes (LEDs) and cold cathode tubes are exemplified.

The optical element 110 is positioned over the light source 102 and is arranged to transmit the light emitted by the light source 102. The optical element 110 includes at least two liquid crystal cells 120 overlapping each other over the light source 102. The number of liquid crystal cells 120 included in the optical element 110 may be three or more, and four liquid crystal cells (first liquid crystal cell 120-1, second liquid crystal cell 120-2, third liquid crystal cell 120-3, and fourth liquid crystal cell 120-4) are arranged over the light source 102 in this order from the side close to the light source 102 in the optical element 110 shown in FIG. 1. In the following description, the lighting device 100 having the optical element 110 including four liquid crystal cells 120 will be used as an example. The direction from the light source 102 to the optical element 110 is defined as a z direction.

The light emitted from the light source 102 is incident on the first liquid crystal cell 120-1 and is emitted from the fourth liquid crystal cell 120-4. As described below, in the lighting device 100, the diffusion of the light is controlled by the liquid crystal cells 120 included in the optical element 110, and the distribution of the light emitted from the optical element 110 can be changed. That is, the light from the light source 102 can be processed to change the shape of the plane (illuminated plane) on which the light illuminates the object.

Figure 2:
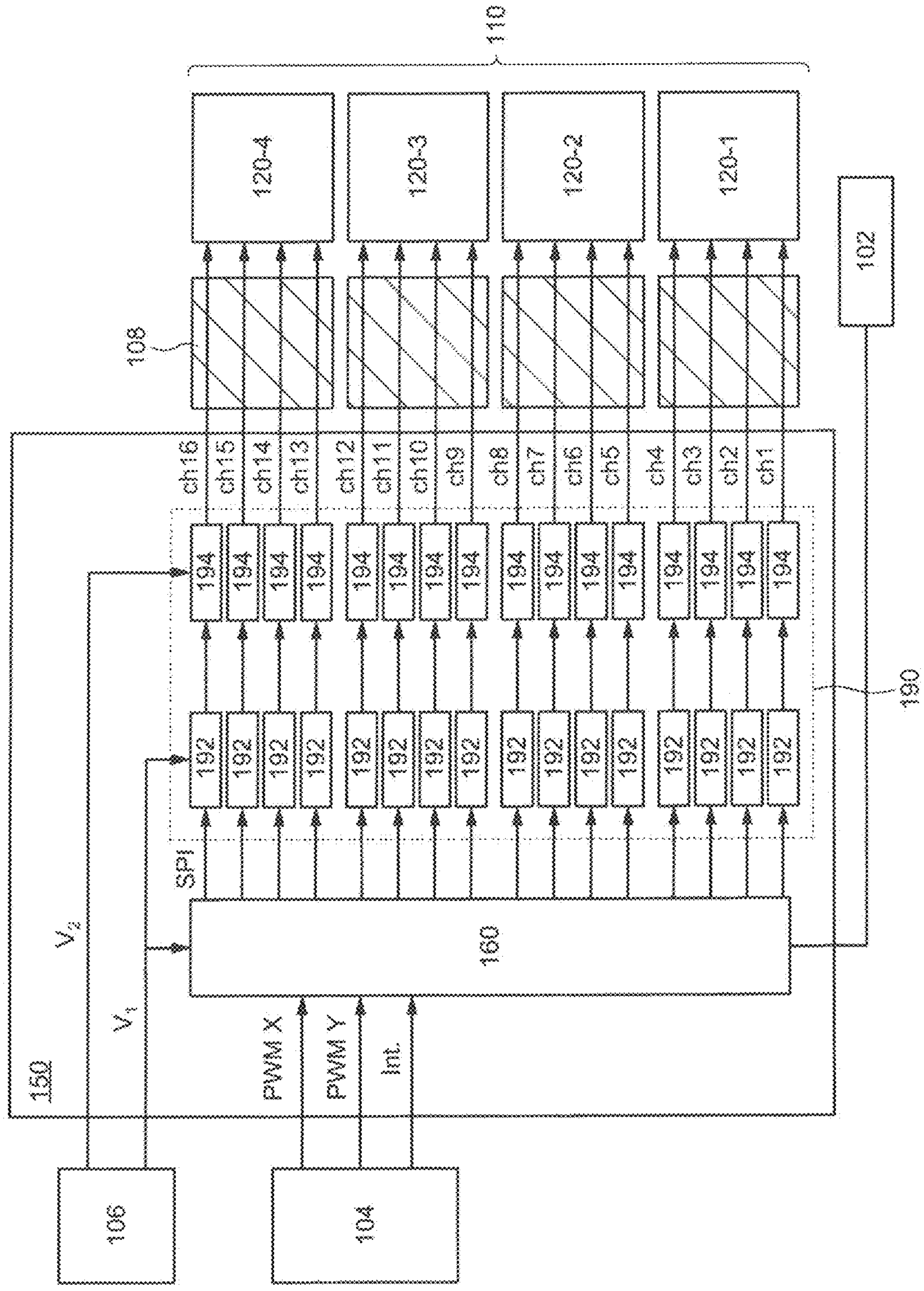
FIG. 2 is a block diagram showing a structure of a lighting device according to an embodiment of the present invention.

FIG. 2 shows a block diagram of the lighting device 100. As shown in FIG. 1 and FIG. 2, each liquid crystal cell 120 is connected to a connector 108 such as a flexible printed circuit (FPC) board and is connected to a controlling device 150 through the connector 108, by which the optical element 110 is controlled by the controlling device 150. The controlling device 150 may be connected to the light source 102 to control the light source 102, or, although not illustrated, the light source 102 may be directly controlled by the input device 104 as described above. The controlling device 150 and the optical element 110 are explained in detail below.

2. Optical Element

Figure 3:
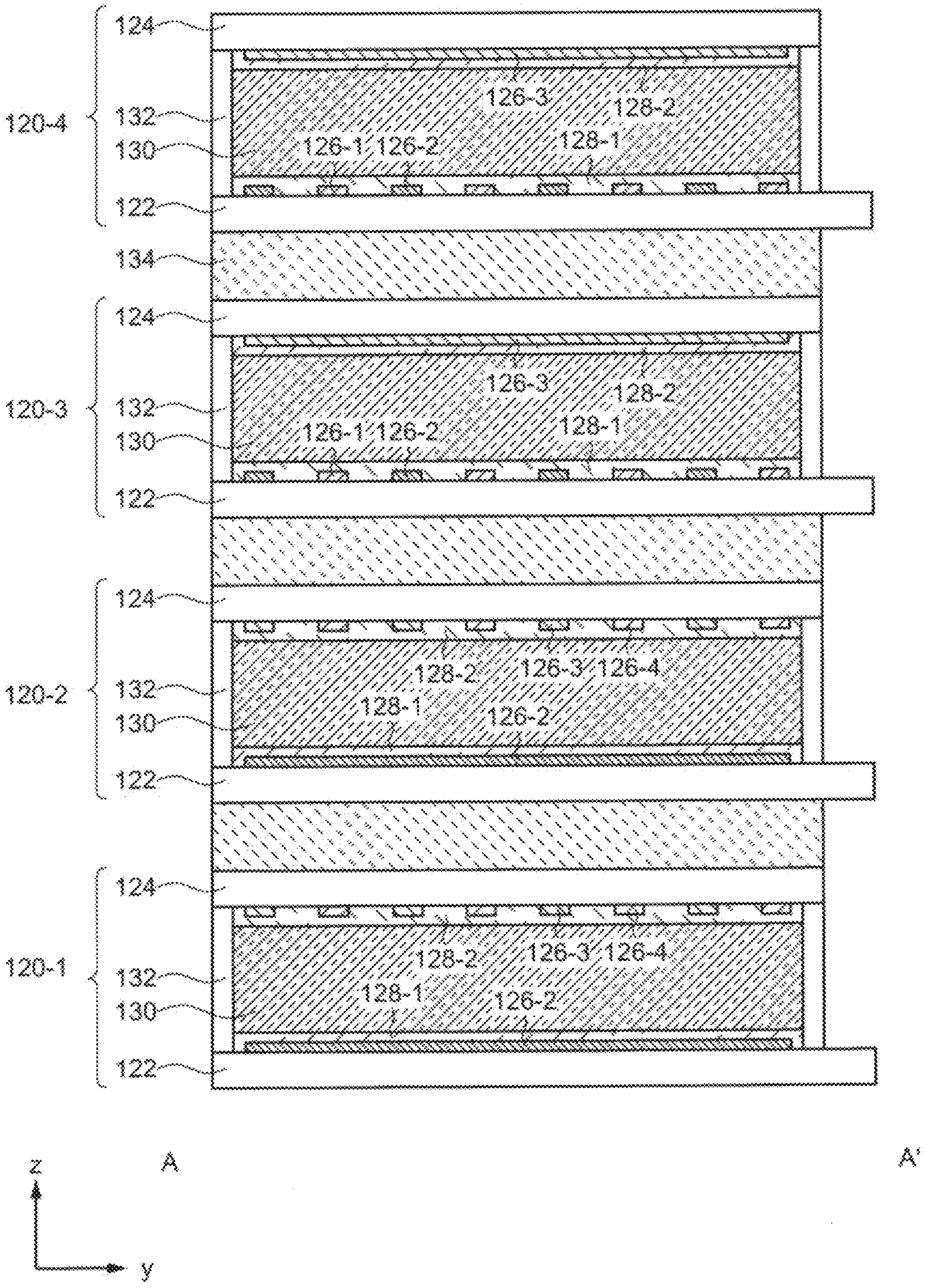
FIG. 3 is a schematic cross-sectional view of a lighting device according to an embodiment of the present invention.
Figure 4:
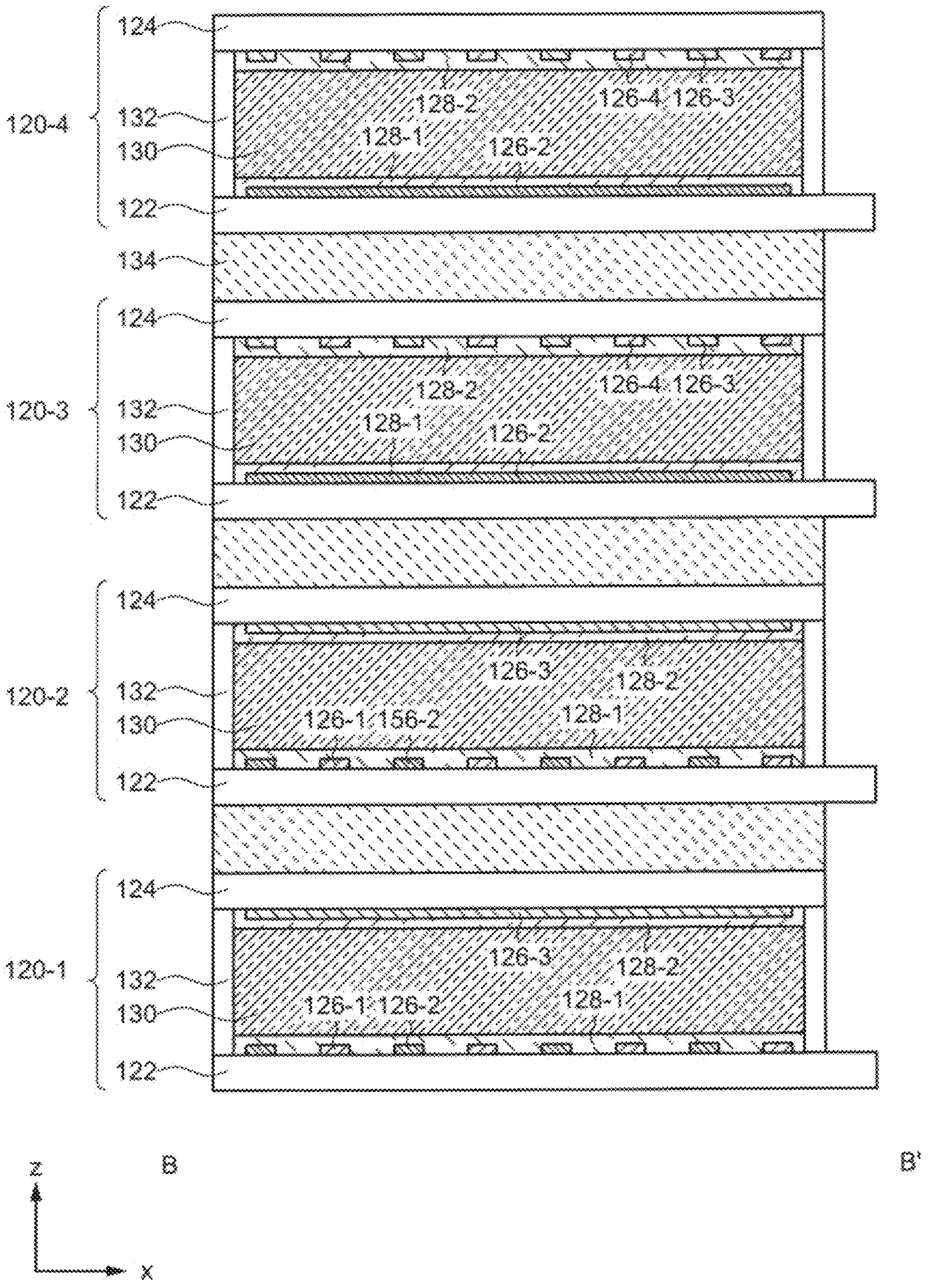
FIG. 4 is a schematic cross-sectional view of a lighting device according to an embodiment of the present invention.

Schematic views of the cross sections of the optical element 110 along the chain line A-A' in FIG. 1 and the chain line B-B' orthogonal thereto are shown in FIG. 3 and FIG. 4, respectively. As shown in these drawings, each of the first liquid crystal cell 120-1 to the fourth 120-4 liquid crystal cell has a first substrate 122 and a second substrate 124 facing each other, and a plurality of first electrodes 126-1, a plurality of second electrodes 126-2, a plurality of third electrodes 126-3, a plurality of fourth electrodes 126-4, a first orientation film 128-1, and a second orientation film 128-2 are provided therebetween. The plurality of first electrodes 126-1 and the plurality of second electrodes 126-2 are disposed over the first substrate 122, and the first orientation film 128-1 is formed over these electrodes. The plurality of third electrodes 126-3 and the plurality of fourth electrodes 126-4 are disposed under the second substrate 124 and between the second substrate 124 and the second orientation film 128-2. The first substrate 122 and the second substrate 124 are fixed to each other by a sealing material 132, and a liquid crystal layer 130 is sealed within the space enclosed by the first substrate 122, the second substrate 124, and the sealing material 132. An adhesive 134 transmitting visible light is provided between adjacent liquid crystal cells 120, thereby fixing the adjacent liquid crystal cells 120 to each other. An acrylic resin-based adhesive or an epoxy resin-based adhesive may be used as the adhesive 134, for example.

(1) Substrate

The first substrate 122 and the second substrate 124 are configured to transmit at least visible light included in the light emitted by the light source 102. For example, a substrate having a light-transmitting property such as a glass substrate and a quartz substrate is used as the first substrate 122 and the second substrate 124. The first substrate 122 and the second substrate 124 may include a polymer having a light-transmitting property such as a polyimide, a polyamide, a polycarbonate, an acrylic resin, a polysiloxane, and the like. The plurality of liquid crystal cells 120 is preferably arranged over the light source 102 such that the normal lines of the first substrate 122 and the second substrate 124 are in the z direction and the main surfaces thereof are in a xy plane.

(2) Electrode

Each of the electrodes 126 serves as an electrode for forming a transverse electric field in the liquid crystal layer 130. A conductive oxide transmitting visible light such as indium tin oxide (ITO) and indium zinc oxide (IZO) is used for the electrodes 126. Alternatively, the electrodes 126 may include a metal such as aluminum, tantalum, molybdenum, tungsten, and an alloy thereof, but is preferred to be formed in a mesh form having a plurality of openings to ensure a light-transmitting property to visible light.

As can be understood from FIG. 3 and FIG. 4, the first electrodes 126-1 and the second electrodes 126-2 are arranged in a stripe shape, are parallel to each other, and are alternately disposed with each other. Thus, one second electrode 126-2 is arranged between adjacent first electrodes 126-1, and one first electrode 126-1 is arranged between adjacent second electrodes 126-2. Similarly, the third electrodes 126-3 and the fourth electrodes 126-4 are also arranged in a stripe shape, are parallel to each other, and are alternately disposed with each other. Thus, one fourth electrode 126-4 is arranged between adjacent third electrodes 126-3, and one third electrode 126-3 is arranged between adjacent fourth electrodes 126-4. However, the direction in which the first electrodes 126-1 and the second electrodes 126-2 extend intersects or is orthogonal to the direction in which the third electrodes 126-3 and the fourth electrodes126-4 extend.

Here, the extending directions of the first electrodes 126-1 and the second electrodes 126-2 are identical to each other, and the extending directions of the third electrode 126-3 and the fourth electrodes 126-4 are also identical to each other between the first liquid crystal cell 120-1 and the second liquid crystal cell 120-2. These relationships are also the same between the third liquid crystal cell 120-3 and the fourth liquid crystal cell 120-4. However, the extending directions of the first electrodes 126-1 (or the second electrodes 126-2) are orthogonal to each other, and the extending directions of the third electrodes 126-3 (or the fourth electrodes 126-4) are also orthogonal to each other between the second liquid crystal cell 120-2 and the third liquid crystal cell 120-3. Although not illustrated, when the optical element 110 consists of two liquid crystal cells 120, the optical element 110 may be configured so that the extending directions of the first electrodes 126-1 (or the second electrodes 126-2) are identical to each other, and the extending directions of the third electrodes 126-3 (or the fourth electrodes 126-4) are also identical to each other between these liquid crystal cells 120. Hereinafter, the explanation is provided where the direction in which the first electrodes 126-1 and the second electrodes 126-2 of the first liquid crystal cell 120-1 extend is defined as a y direction, while the direction in which the third electrodes 126-3 and the fourth electrodes 126 extend is defined as a x direction.

Figure 5:
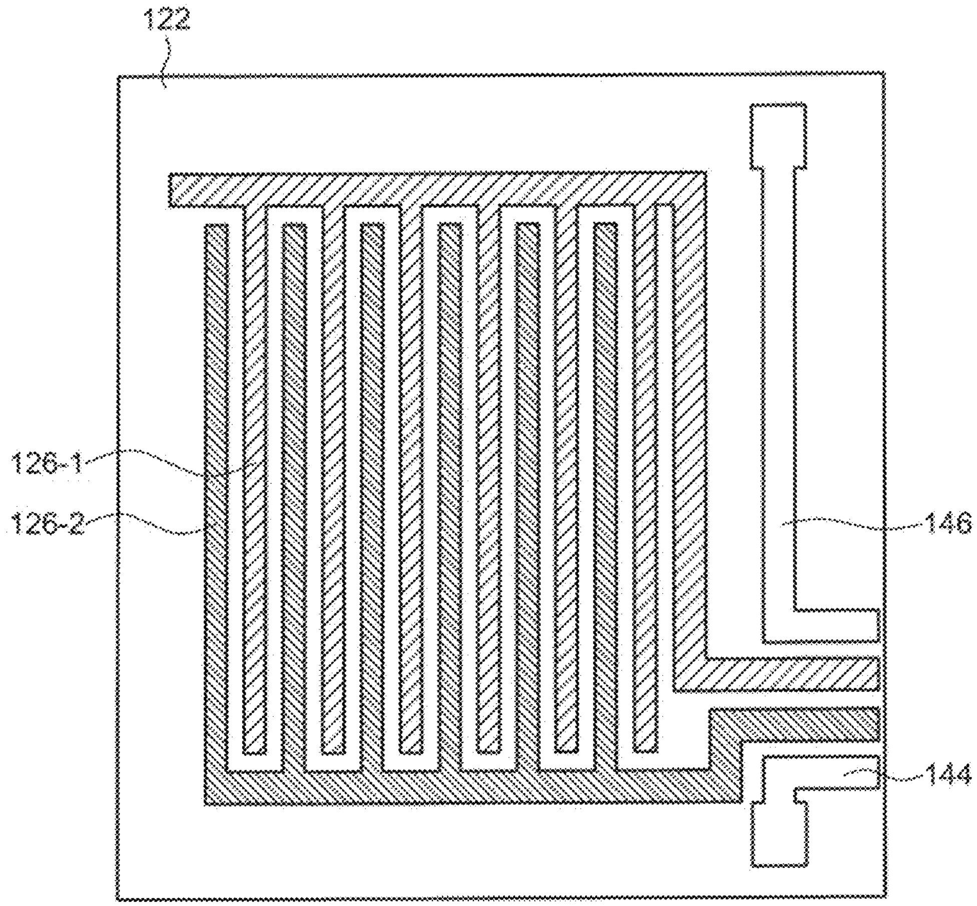
FIG. 5 is a schematic plane view showing electrode patterns of a liquid crystal cell included in an optical element of a lighting device according to an embodiment of the present invention.
Figure 6:
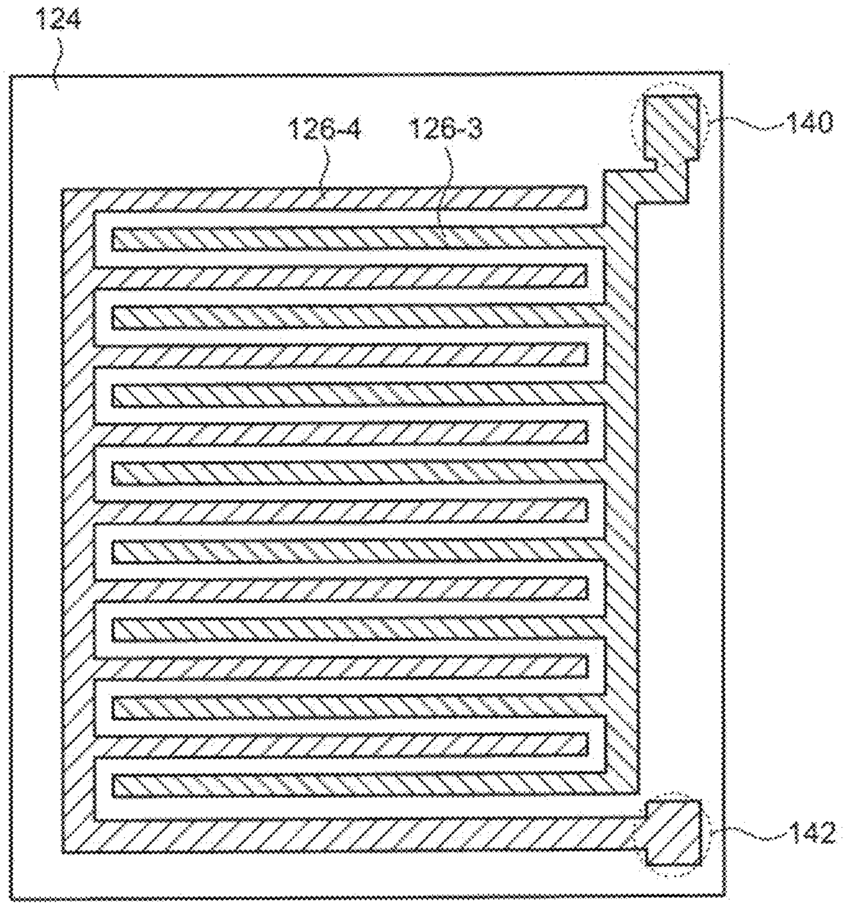
FIG. 6 is a schematic plane view showing electrode patterns of a liquid crystal cell included in an optical element of a lighting device according to an embodiment of the present invention.

As an example, schematic plane views showing the patterns of the electrodes 126 formed over the first substrate 122 and the second substrate 124 of the liquid crystal cell 120 are respectively shown in FIG. 5 and FIG. 6. As shown in FIG. 5, the plurality of first electrodes 126-1 and the plurality of second electrodes 126-2 arranged in a stripe shape are formed over the first substrate 122. The plurality of first electrodes 126-1 are electrically connected to each other to form a comb-shaped pattern. Similarly, the plurality of second electrodes 126-2 are electrically connected to each other to form a comb-shaped pattern. The comb-shaped patterns of the first electrodes 126-1 and the second electrodes 126-2 extend to one side of the first substrate 122 and are electrically connected to the connector 108 (see FIG. 1.) Connecting wirings 144 and 146 are provided over the first substrate for electrical connection of the third electrodes 126-3 and the fourth electrodes 126-4 to the connector 108.

Similarly, the plurality of third electrodes 126-3 and the plurality of fourth electrodes 126-4 arranged in a stripe shape are formed over the second substrate 124. The plurality of third electrodes 126-3 are electrically connected to each other to form a comb-shaped pattern, and the plurality of fourth electrodes 126-4 are also electrically connected to each other to form a comb-shaped pattern (see FIG. 6. Note that FIG. 6 shows a state viewed from the Z+ direction similar to FIG. 5, and each electrode provided through the substrate is shown as a solid line to promote understanding). The comb-shaped patterns of the third electrodes 126-3 and the fourth electrodes 126-4 extend to a side of the second substrate 124 to respectively form terminals 140 and 142. When the first substrate 122 and the second substrate 124 are bonded to each other, the terminals 140 and 142 are electrically connected to the connecting wiring 144 and 146, respectively, via a conductive material which is not illustrated. Thus, a voltage is applied to all of the electrodes 126 from the controlling device 150 via the connector 108 located over the first substrate 122, by which the liquid crystal cells 120 can be driven. The same is applied to the other liquid crystal cells 120. Thus, the plurality of liquid crystal cells 120 can be driven independently from each other.

(3) Orientation Film

In each of the liquid crystal cells 120, the first orientation film 128-1 covers the plurality of first electrodes 126-1 and the plurality of second electrodes 126-2, and the second orientation film 128-2 covers the plurality of third electrodes 126 and the plurality of fourth electrodes 126-4. The orientation films 128 include a polymer such as a polyimide. Each orientation film 128 is provided with orienting properties by an orientation treatment such as rubbing or photo-orientation, by which the orientation films function to orient the liquid crystal molecules included in the liquid crystal layer 130 in a certain direction. Hereafter, the direction in which the orientation film 128 orient the liquid crystal molecules so that their longitudinal directions are oriented is referred to as an orientation direction.

In each of the liquid crystal cells 120, the orientation direction of the first orientation film 128-1 is orthogonal to the direction in which the first electrodes 126-1 and the second electrodes 126-2 extend. Similarly, the orientation direction of the second orientation film 128-2 is orthogonal to the direction in which the third electrodes 126-3 and the fourth electrodes 126-4 extend. Thus, in each liquid crystal cell 120, the orientation directions of the first orientation film 128-1 and the second orientation film 128-2 are orthogonal to each other.

(4) Liquid Crystal Layer

The liquid crystal layer 130 refracts the transmitting light or changes the polarization state of the transmitting light according to the orientation state of the liquid crystal molecules. Nematic liquid crystals and the like are used as the liquid crystals in the liquid crystal layer 130. The liquid crystal may be a positive type or a negative type. A chiral agent causing a twist of the liquid crystal is preferably included in the liquid crystal layer 130.

(5) Control of Light Distribution

Figure 7:
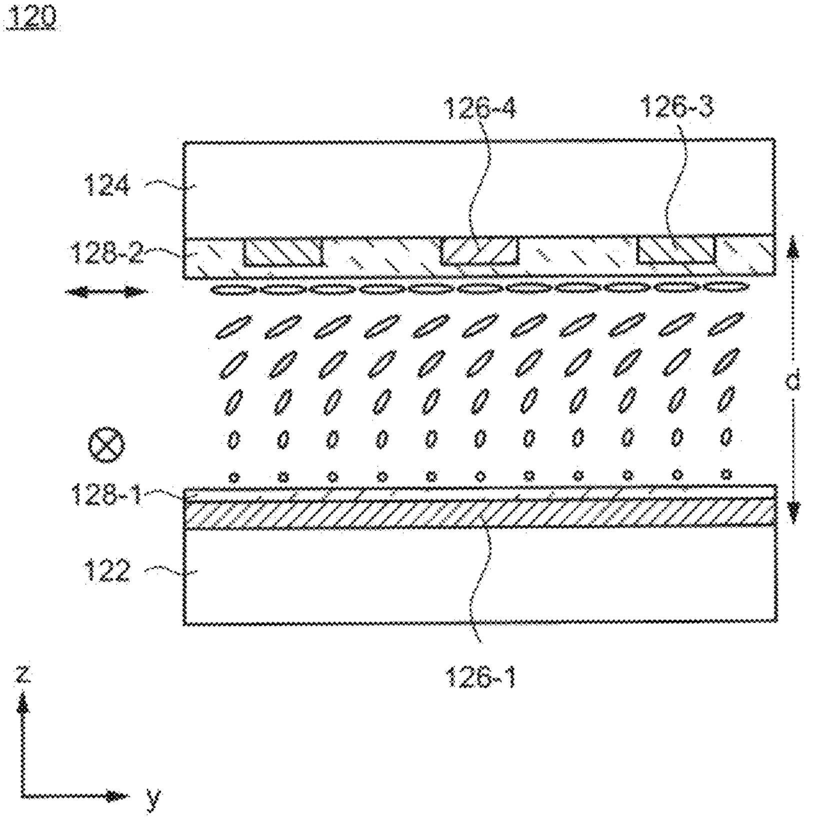
FIG. 7 is a schematic cross-sectional view for explaining light diffusion caused by an optical element of a lighting device according to an embodiment of the present invention.
Figure 8:
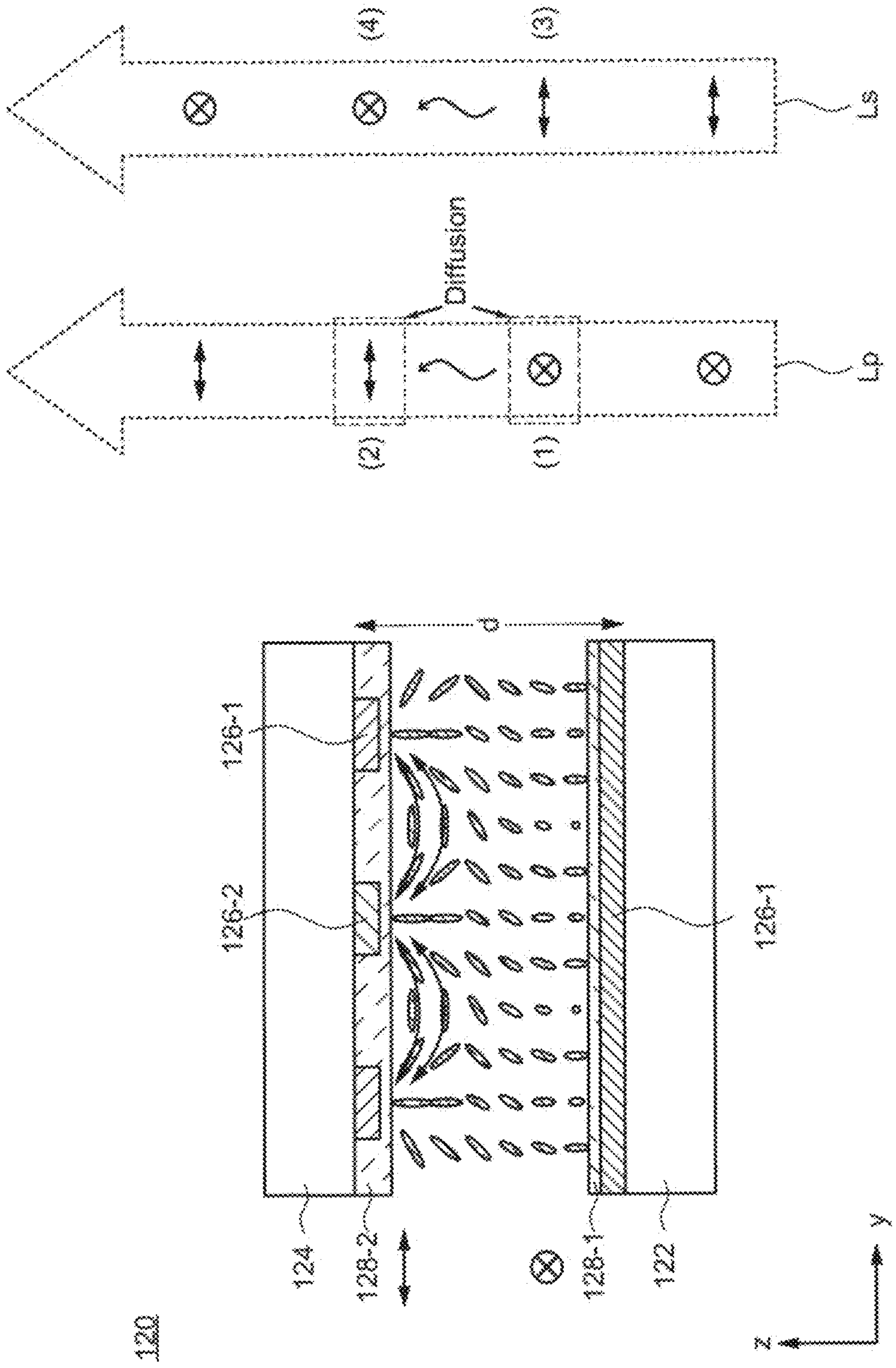
FIG. 8 is a schematic cross-sectional view for explaining light diffusion caused by an optical element of a lighting device according to an embodiment of the present invention.

The control of light distribution using the optical element 110 is explained using FIG. 7 and FIG. 8. FIG. 7 and FIG. 8 are schematic cross-sectional views for explaining the optical properties of one liquid crystal cell 120 and respectively correspond to the states in which no voltage and a voltage are applied to the electrodes 126. In the drawings, the liquid crystal molecules included in the liquid crystal layer 130 are schematically shown as circles or ellipses.

As shown in FIG. 7, the liquid crystal molecules on the first substrate 122 side of the liquid crystal layer 130 are oriented in the x direction, and the liquid crystal molecules on the second substrate 124 side of the liquid crystal layer 130 are oriented in the y direction according to the orientation directions of the orientation films 128. Therefore, in a state without any electric field where no voltage is applied to any of the first electrodes 126-1 to the fourth electrodes 126-4 electrodes, the liquid crystal molecules in the liquid crystal layer 130 are oriented so as to twist 90° in the xy plane as they approach from the first substrate 122 to the second substrate 124. In addition, the polarization plane (direction of the polarization axis or polarization component) of the light passing through the liquid crystal layer 130 rotates 90° according to the orientation direction of the liquid crystal molecules. That is, the light passing through the liquid crystal layer 130 (more specifically, the polarization component of the transmitted light) is optically rotated.

When a voltage is applied to the first electrodes 126-1 to the fourth electrodes 126-4 so that a potential difference is generated between adjacent electrodes 126, a transverse electric field is generated between two adjacent electrodes 126. As a result, the liquid crystal molecules in the liquid crystal layer 130 are oriented so as to twist 90° in the xy plane as they approach from the first substrate 122 to the second substrate 124 as shown in FIG. 8. At the same time, the liquid crystal molecules close to the first substrate 122 are aligned in a convex arc shape with respect to the first substrate 122 due to the transverse electric field between the first electrode 126-1 and the second electrode 126-2, while the liquid crystal molecules close to the second substrate 124 are aligned in a convex arc shape with respect to the second substrate 124 due to the transverse electric field between the third electrode 126-3 and the fourth electrode 126-4. The liquid crystal molecules arranged in a convex arc shape have a refractive index distribution, and light having the same polarization axis as the orientation direction of the liquid crystal molecules is diffused. Note that the cell gap d, which is the distance between the first substrate 122 and the second substrate 124, is sufficiently larger than the distance between two adjacent electrodes (e.g., 8 $\mu m \leq d \leq 50$ μm, more preferably $\mu m \leq d \leq 30$ μm, yet more preferably 15 $\mu m \leq d \leq 25$ μm). Thus, the electric field formed between the above electrodes 126 does not significantly affect the liquid crystal molecules located near the mid-point between the first substrate 122 and the second substrate 124.

The light emitted from the light source 102 contains polarization components in the x direction (P polarization component) and in the y direction (S polarization component). In the following explanation, the light emitted from the light source 102 is divided into light Lp with the P polarization component and light Ls with the S polarization component for convenience.

Since the polarization plane of light Lp incident from the first substrate 122 side is the same as the orientation direction of the liquid crystal molecules on the first substrate 122 side, the light Lp is diffused in the x direction according to the refractive index distribution of the liquid crystal molecules (see (1) in FIG. 8). In addition, the light Lp is optically rotated when passing through the liquid crystal layer 130, and the polarization component changes from the P polarization component to the S polarization component. Since the polarization plane of the S polarization component of the light Lp is the same as the orientation direction of the liquid crystal molecules on the second substrate 124 side, the light Lp is diffused in the y direction according to the refractive index distribution of the liquid crystal molecules (see (2) in FIG. 8).

On the other hand, since the polarization plane of the light Ls incident from the first substrate 122 side is different from (orthogonal to) the orientation direction of the liquid crystal molecules on the first substrate 122 side, the light Ls is not diffused (see (3) in FIG. 8). In addition, the light Ls is optically rotated when passing through the liquid crystal layer 130, and the polarization component changes from the S polarization component to the P polarization component. Since the P polarization component of light Ls is different from (orthogonal to) the orientation direction of the liquid crystal molecules on the second substrate 124 side, the light Ls is not diffused (see (4) in FIG. 8).

Thus, when the light passes through one liquid crystal cell 120, one polarization component is selectively diffused. Although not illustrated, the light Ls passing through the first liquid crystal cell 120-1 can be diffused in the x direction and the y direction by the second liquid crystal cell 120-2 in a similar principle. Therefore, all of the polarization components can be diffused in the x direction and the y direction by using two liquid crystal cells 120 overlapping each other. Since the degree of diffusion (diffusion degree) can also be changed by changing the voltage applied to the electrodes 126, the light can be arbitrarily diffused in the x direction and the y direction by overlapping the plurality of liquid crystal cells 120 and controlling the voltage applied to each electrode 126. As a result, the shape of the illuminated plane of the light from the light source 102 can be transformed into a variety of shapes such as circles, ellipses, crosses, and so on.

3. Controlling Device and Driving Method Lighting Device Using Controlling Device (1) Structure of Controlling Device The controlling device 150 is a device for determining the voltage to be applied to the electrodes 126 of the liquid crystal cells 120 of the optical element 110 according to pulse-width modulated input signals input from the input device 104 and for supplying pulse-amplitude modulated output signals to the electrodes 126. As shown in the block diagram in FIG. 2, a power supply 106 is connected to the controlling device 150, by which power is supplied to the controlling device 150. The power supply 106 is configured to generate two different voltages $V_1$ and $V_2$. For example, the power supply 106 is capable of generating voltages $V_1$ and $V_2$ of 3.3 V and 30 V, respectively.

The controlling device 150 includes a signal-generation circuit unit 160 and a voltage-application unit 190. The signal-generation circuit unit 160 is an integrated circuit with arithmetic functions and operates based on a predetermined program. The signal-generation circuit unit 160 is composed of, for example, a central processing unit (CPU), a microprocessor (MPU), an integrated circuit (IC), an application-specific integrated circuit (ASIC), a field programmable gate array (FPGA), and the like. The signal-generation circuit unit 160 may include a random-access memory (RAM) as well as a nonvolatile memory such as a flash memory and a read-only memory. The signal-generation circuit unit 160 receives a supply of voltage $V_1$ from the power supply 106 and performs arithmetic processing on the input signals input from the input device 104 according to the program. As described above, the lighting device 100 is configured to control the diffusion of the light from the light source 102 independently in two directions (x direction and y direction). Hence, the input signals from the input device 104 include two independent signals for the diffusion in the x direction and the y direction (a first signal and a second signal respectively indicated by PWM X and PWM Y in FIG. 2), and both signals are input to the controlling device 150 in a pulse-width modulation fashion. Note that, when the controlling device 150 controls the light source 102, the controlling device 150 may be configured so that signals (Int.) for controlling the intensity and color of the light from the light source 102 are input from the input device 104 to the signal-generation circuit unit 160. The signal Int. is also input as a pulse-width modulated signal.

Figure 9:
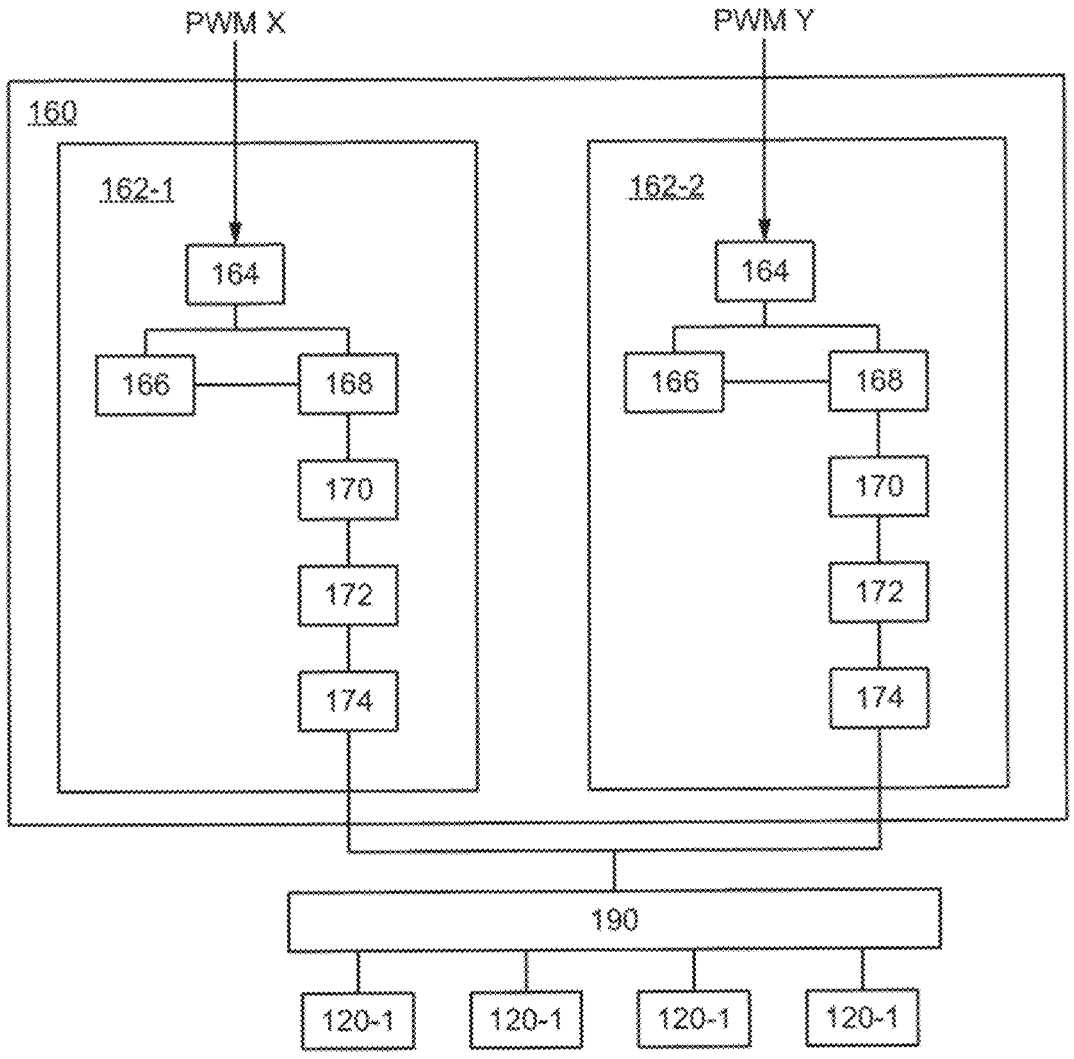
FIG. 9 is a block diagram showing a structure of a controlling device of a lighting device according to an embodiment of the present invention.

FIG. 9 shows a block diagram showing the structure of the signal-generation circuit unit 160. The signal-generation circuit unit 160 has signal-converting units (first signal-converting unit 162-1 and second signal-converting unit 162-2) for respectively processing the first signal and the second signal, and each signal-converting unit 162 may include, as its main components, a counter circuit 164, a divider circuit 166, a processing circuit 168, a filter circuit 170, a correction circuit 172, and a voltage-calculation circuit 174 as an applied-voltage calculation unit.

The duty ratio of the input signal input to the signal-generation circuit unit 160 from the input device 104 is calculated by the counter circuit 164 and the divider circuit 166. When the duty ratio of the input signal is 1 (100%) or 0 (0%), the duty ratio may not be able to be calculated by the counter circuit 164 and the divider circuit 166 because the potential of the input signal is always High or Low over a plurality of frame periods. Therefore, a signal indicating that the duty ratio is 1 or 0 is generated using the processing circuit 168 which is a circuit performing an exceptional process. The filter circuit 170 is a circuit performing filter processing on the duty ratio obtained as a result of the calculation to remove exceptional values or reduce variations in the duty ratio caused by minute changes in the pulse width of the input signal between the frames. This processing includes, for example, median filter processing and averaging filter processing. The correction circuit 172 calculates the diffusion degree by referring to a lookup table showing the relationship between the duty ratio of the input signal and the diffusion degree, which is the degree of the diffusion of the light from the light source 102 caused by the optical element 110. The voltage-calculation circuit 174 calculates and determines the voltage to be supplied to each electrode 126 on the basis of the diffusion degree, generates a voltage signal, and supplies the voltage signal to the voltage-application unit 190. The lookup table is incorporated into the program for operating the signal-generation circuit unit 160 or is stored in a nonvolatile memory which is not illustrated.

The voltage-application unit 190 (see FIG. 9 and FIG. 2) includes plural pairs of a digital-to-analog conversion circuit (DAC) 192 and an amplification circuit (AMP) 194, which correspond to the electrodes 126 of the liquid crystal cell 120. In other words, one single channel (ch) is formed by one pair of the digital-to-analog conversion circuit 192 and the amplification circuit 194, and each electrode 126 is connected to the channel formed by one pair of the digital-to-analog conversion circuit 192 and the amplification circuit 194. Hence, a voltage can be independently supplied to each of the electrodes 126. The digital-to-analog conversion circuit 192 is connected to the signal-generation circuit 160 by a serial bus such as a serial peripheral interface (SPI). The digital-to-analog conversion circuit 192 and the amplification circuit 194 are respectively supplied with voltages $V_1$ and $V_2$ from the power supply 106. The voltage signals output from the signal-generation circuit unit 160 are converted to a digital signal by the digital-to-analog conversion circuit 192, amplified by the amplification circuit 194, and supplied to the electrodes 126 as pulse-amplitude modulated signals.

(2) Driving Method of Lighting Device

As described above, the first input signal and the second input signal input from the input device 104 are processed by the controlling device 150. Since these processes are identical, the driving method of the lighting device 100 is explained using one input signal.

Figure 10:
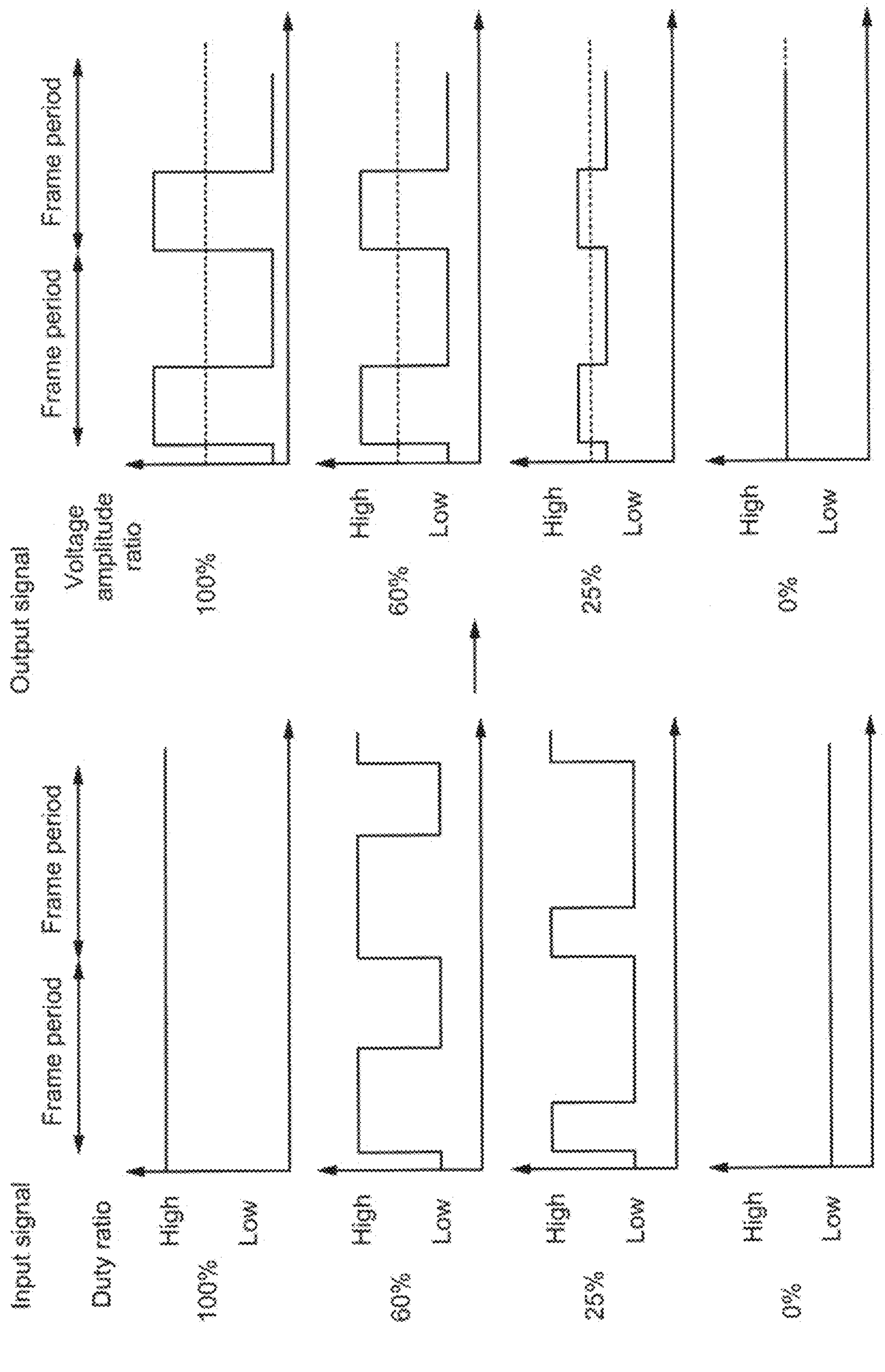
FIG. 10 is a schematic drawing showing a driving method of a lighting device according to an embodiment of the present invention.

In the lighting device 100, the input signals, which are pulse-width modulated signals, are used to input the diffusion degree of the light from the light source 102 in the x direction and the y direction, and a high potential (High) or a low potential (Low) is input from the input device 104 during a period depending on the diffusion degree in each frame period as shown in FIG. 10. The cycle of the frame period is equal to or higher than 30 Hz and equal to or lower than 120 Hz and is preferably equal to or higher than 60 Hz and equal to or lower than 120 Hz. When the cycle of one frame period is in the above range, the voltage applied to the electrodes 126 can be retained by the capacitance of the liquid crystal layer 130. The duty ratio of this input signal (period of high potential/frame period) is converted by the controlling device 150 into the voltage-amplitude ratio of the pulse-amplitude modulated output signal, and a voltage corresponding to the voltage-amplitude ratio is applied to each electrode 126. The input device 104 is provided with a slider or tab (knob), for example, for specifying the diffusion degree of the light, and the diffusion degree is input by the amount of sliding of the slider or the amount of rotation of the tab. The input device 104 may further be configured to adjust the brightness and color of the light from the light source 102.

Figure 11:
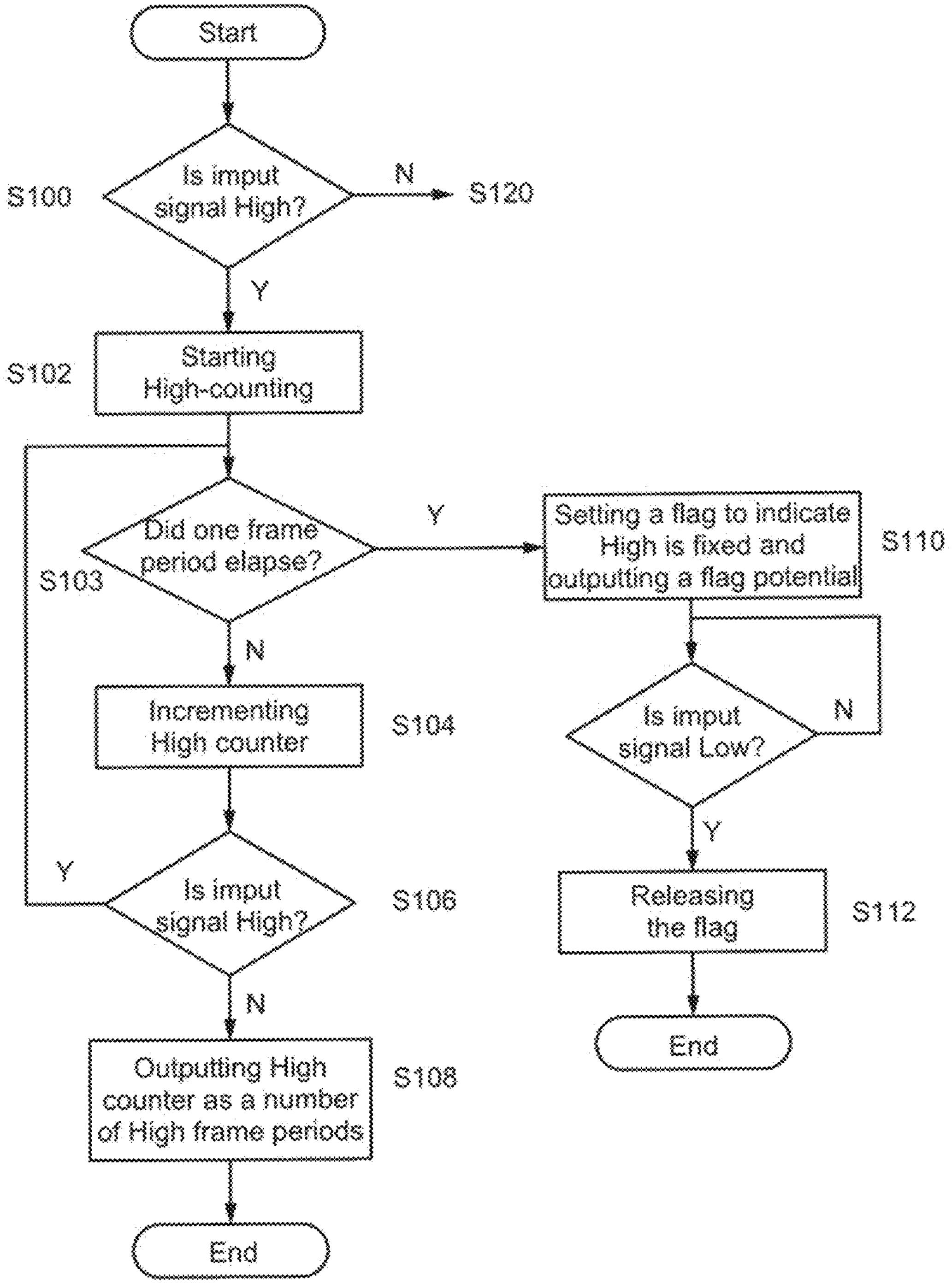
FIG. 11 is a flowchart for explaining an example of a driving method of a lighting device according to an embodiment of the present invention.
Figure 12:
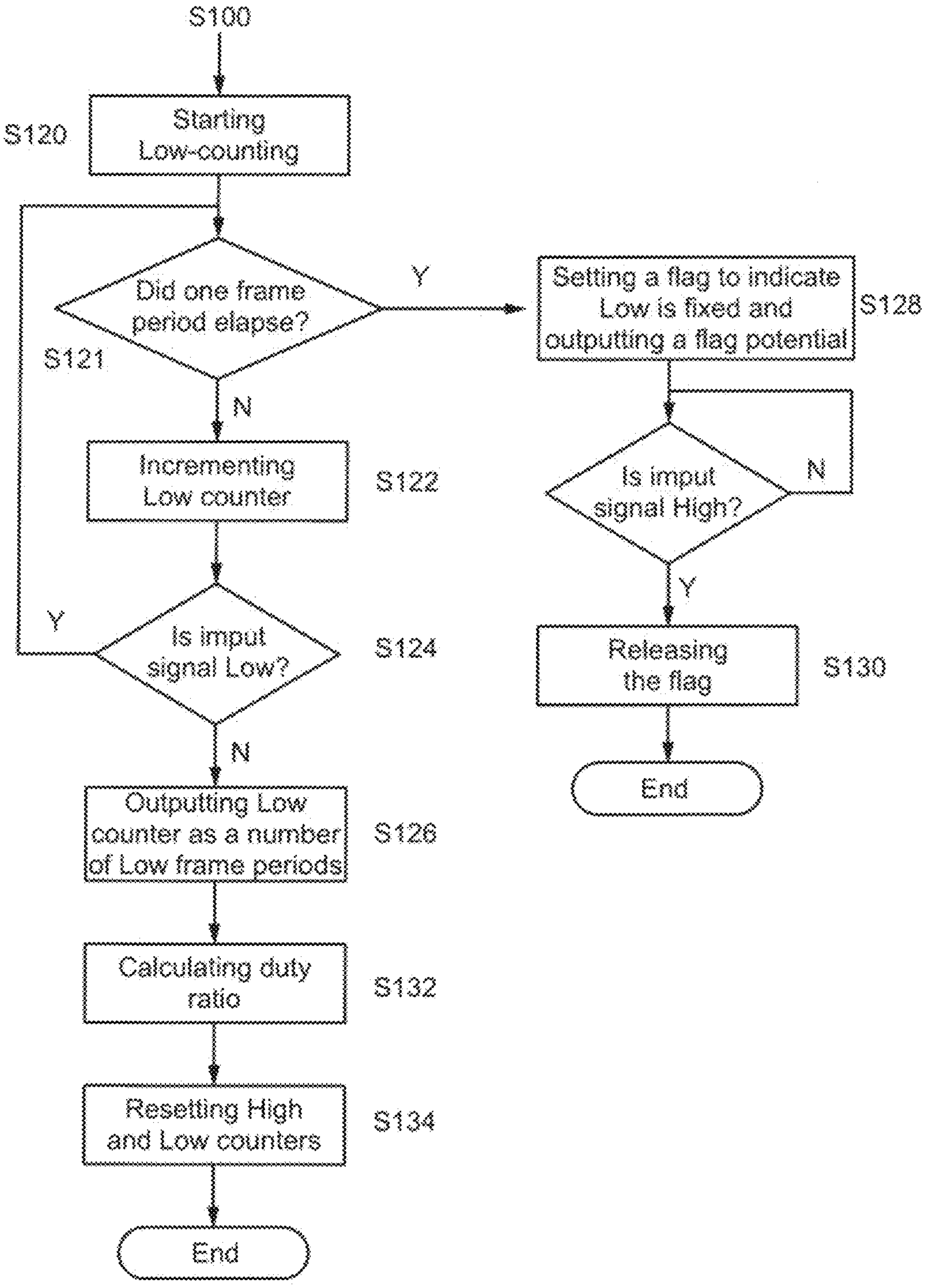
FIG. 12 is a flowchart for explaining an example of a driving method of a lighting device according to an embodiment of the present invention.

FIG. 11 and FIG. 12 demonstrate an example of a flowchart showing the present driving method. In the controlling device 150, once one frame period starts, whether the potential of the input signal is High or Low is determined at a constant interval (for example, every 1/200 to 1/2000 of the frame period) using a clock signal (S100). When the potential of the input signal is determined to be High (S100: YES), High-counting is started in the counter circuit 164 (S102). At this time, if one frame period (i.e., this frame period) has not elapsed, the counter of High is increased (incremented) by one (S104).

After that, whether the input signal maintains the High potential is determined at a constant interval after this frame period is started (S106). If the potential of the input signal is still High, whether this frame period has elapsed or not is determined again (S103). If this frame period has not elapsed (S103: NO), the High counter is incremented by one again (S104), and whether the input signal still maintains the High status is determined again (S106). In the case where the duty ratio is greater than 0% and less than 100%, the potential of the input signal becomes Low before this frame period elapses (S106: NO). Thus, the number of counters which have been accumulated at the time when the potential of the input signal becomes Low corresponds to the period of High. This period of High is output from the counter circuit 164 to the divider circuit 166 (S108).

On the other hand, when the duty ratio is 100%, no signal of Low is input over one frame period (High potential is maintained over the frame period). Therefore, the loop of steps S103 to S106 described above is repeated over this frame period. When this frame period elapses (S103: YES), a flag is set to indicate that High is fixed, and a potential of High is output to the processing circuit 168 as a flag potential indicating this fact, for example, in order to indicate that the input signal is always High (S110). The processing in the processing circuit 168 is described later. After that, the flag is held if the input signal still maintains High. However, the flag is released when the input signal becomes Low, and a flag potential of, for example, Low is output to the processing circuit 168 to indicate that the input signal becomes Low (S112). That is, according to the flowchart shown in FIG. 11, in the case where the procedure ends through the step S108, it is demonstrated that the input signal became Low before the end of the frame period. In this case, the procedure returns to the start of this flowchart again and follows the flowchart of FIG. 12 through S100. On the other hand, if the procedure ends through the step S112, it is indicated that the frame period has been completed, the procedure returns to the start of this flowchart, and then the next frame period starts.

Furthermore, in the case where the potential of the input signal is maintained at Low at the beginning of a frame period, or in the case where the potential of the input signal changes from High to Low during one frame period as described above (S100: No), Low-counting is started (FIG. 12, S120). If one frame period has not elapsed since the start of that frame period, the Low counter is increased (incremented) by one (S122). In this case, whether the input signal is High or Low is determined again at a constant interval (S124). If the input signal still maintains the Low potential, it is determined again whether or not this frame period has elapsed (S121). If this frame period has not elapsed (S121: NO), the Low counter is incremented by one again (S122), and whether or not the input signal is maintaining the Low state is determined again (S124). If the duty ratio is greater than 0% and less than 100%, the input signal becomes High before this frame period ends (S124: NO). Thus, the number of counters accumulated at the time when the input signal changes to High corresponds to the Low period. This Low period is output to the divider circuit 166 (S126).

On the other hand, if the duty ratio is 0%, no High signal is input during this frame period. Thus, when this frame period elapses, a flag is set to indicate that Low is fixed, and the potential of High indicating this fact is output to the processing circuit 168, for example, in order to indicate that the input signal is always Low in this frame (S128). The processing in processing circuit 168 is described later. After that, if the input signal still maintains Low, the flag is fixed. However, when the input signal becomes High, the flag is released, and a potential of Low is output to the processing circuit 168 as a flag potential to indicate that the input signal becomes high, for example (S130).

The calculation of the duty ratio is performed by the divider circuit 166. The summation of the High period obtained in the step S108 and the Low period obtained in the step S126 is output as the frame period, the ratio of the High period to the frame period is calculated as the duty ratio, and a potential corresponding to the duty ratio is output to the processing circuit 168 (S132). After that, the counter circuit 164 is reset (S134). In this way, according to the flowcharts shown in FIG. 11 and FIG. 12, when the duty ratio is not 0% nor 100%, the procedure starts from the start of FIG. 11, reaches the step S108, moves to the flowchart in FIG. 12 after going through the step S100 again, and then reaches the step S134. When the procedure reaches the step S134, the frame period ends, and the procedure returns to the start of FIG. 11 at the time when the next frame period starts. If the duty ratio is 0%, the procedure reaches S130 through the steps S100, S120, and S128, and the frame period ends. After that, the flow returns to the start of FIG. 11 at the time when the next frame period starts. If the duty ratio is 100%, the procedure starting from FIG. 11 reaches S112 through the steps S100 and S110, and the frame period ends. After that, the procedure returns to the start of FIG. 11 at the time when the next frame period starts.

Figure 13:
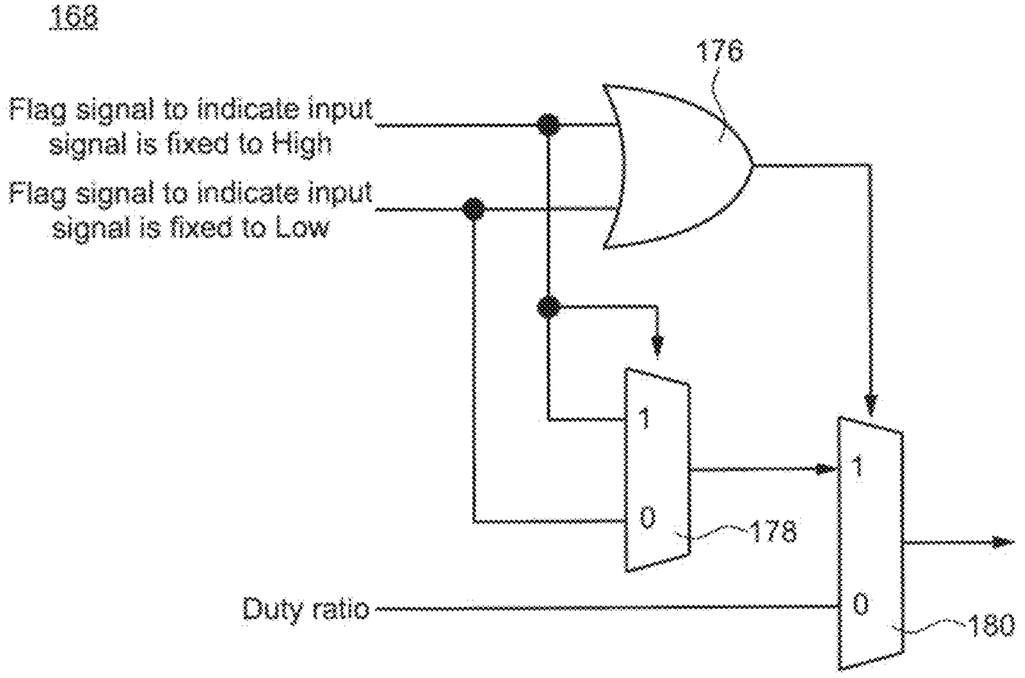
FIG. 13 is an equivalent circuit of a processing circuit included in a driver circuit of a lighting device according to an embodiment of the present invention.

When the duty ratio is 100% or 0%, an exception processing is performed in the processing circuit 168. An example of the equivalent circuit of the processing circuit 168 is shown in FIG. 13. The processing circuit 168 illustrated in FIG. 13 includes an OR circuit 176, a first multiplexer 178, and a second multiplexer 180. Two input terminals of the OR circuit 176 are connected to the counter circuit 164 and are input with the flag signals respectively indicating that the input signals are fixed to High and Low. An output terminal of the OR circuit 176 is connected to a selection control input terminal of the second multiplexer 180. Hence, when the input signal is fixed to High or Low, a High selection control signal is input to the second multiplexer 180. Two input terminals and a selection control input terminal of the first multiplexer 178 are connected to the counter circuit. The flag signal indicating that the input signal is fixed to the High potential is input to one of the input terminals and the selection control input terminal of the first multiplexer 178, while the other input terminal is input with the flag signal indicating that the input signal is fixed at the Low potential. One of the input terminals of the second multiplexer 180 is connected to the divider circuit 166 and is input with the potential corresponding to the duty ratio, while the other input terminal is connected to an output terminal of the first multiplexer 178.

Therefore, when no flag signal indicating that the potential of the input signal is fixed at High or Low is input, a potential corresponding to the duty ratio which is greater than 0% and less than 100% and is calculated by the divider circuit 166 is output from the second multiplexer 180. On the other hand, when the flag signal indicating that the potential of the input signal is fixed at High is input to the OR circuit 176, a potential indicating a duty ratio of 100% is output from the second multiplexer 180. Conversely, when the flag signal indicating that the input signal potential is fixed at Low is input to the OR circuit 176, a potential indicating a duty ratio of 0% is output from the second multiplexer 180. Note that the configuration of the processing circuit 168 is not limited to the above configuration, and any circuit configuration may be used as long as the circuit can realize the functions described above.

After the above processes, the signals output from the processing circuit 168 are processed by the filter circuit 170 and the correction circuit 172 to determine the diffusion degree. According to this diffusion degree, the voltage-calculation circuit 174 calculates the voltage to be supplied to each electrode 126 and supplies it as a voltage signal to the voltage-application unit 190.

The voltage signal output from the signal-generation circuit unit 160 is converted to a digital signal by the digital-to-analog conversion circuit 192, resulting in the generation of the output signal which is a pulse-amplitude modulated signal with an amplitude corresponding to the duty ratio of the input signal. This output signal is amplified in voltage by the amplification circuit 194 and is supplied to the electrode 126 of the liquid crystal cell 120 through each channel.

As described above, in the lighting device according to an embodiment of the present invention, the pulse-width modulated input signal input from the input device 104 is converted into the pulse-amplitude modulated output signal, and the optical element 110 can be controlled using this output signal. Thus, it is possible to connect the lighting device to a wide range of devices regardless of communication modes.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A lighting device comprising:
a light source;
an optical element arranged so that light emitted from the light source passes therethrough and comprising at least two liquid crystal cells overlapping each other; and
a controlling device for controlling the optical element,
wherein each of the at least two liquid crystal cells comprises:
a plurality of first electrodes and a plurality of second electrodes alternately arranged in a stripe shape;
a liquid crystal layer over the plurality of first electrodes and the plurality of second electrodes; and
a plurality of third electrodes and a plurality of fourth electrodes alternately arranged over the liquid crystal layer, intersecting the plurality of first electrodes and the plurality of second electrodes, and disposed in a stripe shape,
the controlling device is configured to be input with a pulse-width modulated first input signal and second input signal which specify a degree of diffusion of the light caused by the optical element in an extending direction of the plurality of first electrodes and an extending direction of the plurality of third electrodes, and
the controlling device is further configured to convert the first input signal and the second input signal into a pulse-amplitude modulated first output signal and second output signal, respectively, according to duty ratios of the first input signal and the second input signal and supply the first output signal and second output signal to the optical element.

2. The lighting device according to claim 1,
wherein the at least two liquid crystal cells include a first liquid crystal cell, a second liquid crystal cell, a third liquid crystal cell, and a fourth liquid crystal cell arranged in this order from a side of the light source, and
the extending direction of the plurality of first electrodes of the first liquid crystal cell and the second liquid crystal cell intersects the extending direction of the plurality of first electrodes of the third liquid crystal cell and the fourth liquid crystal cell.

3. The lighting device according to claim 1,
wherein the controlling device includes a signal-converting unit configured to calculate the duty ratio of each of the first input signal and the second input signal.

4. The lighting device according to claim 3,
wherein the signal-converting unit comprises, for each of the first input signal and the second input signal:
a counter circuit and a divider circuit for calculating the duty ratios;
a processing circuit for performing an exception processing when the duty ratios are 0 or 1;
a filtering circuit for performing filtering on the duty ratios; and
a correction circuit for determining the degree of diffusion from the duty ratios subjected to the filtering while referring to a lookup table.

5. The lighting device according to claim 4,
wherein the processing circuit comprises an OR circuit, a first multiplexer, and a second multiplexer,
two input terminals of the OR circuit are connected to the counter circuit, and an output terminal is connected to a selection-control input terminal of the second multiplexer,
two input terminals and a selection-control input terminal of the first multiplexer are connected to the counter circuit, and
one output terminal of the second multiplexer is connected to the divider circuit, and the other output terminal is connected to an output terminal of the first multiplexer.

6. The lighting device according to claim 1,
wherein the controlling device comprises:
an applied-voltage calculating unit configured to calculate amplitudes of the first output signal and the second output signal on the basis of the degree of diffusion with respect to each of the first input signal and the second input signal; and
a voltage-application unit for applying a voltage to the optical element according to the amplitudes of the first input signal and the second input signal.

7. The lighting device according to claim 6,
wherein the voltage-application unit comprises a plurality of digital-to-analogue conversion circuits and a plurality of amplification circuits respectively connected to the plurality of first electrodes, the plurality of second electrodes, the plurality of third electrodes, and the plurality of fourth electrodes of the at least two liquid crystal cells.

8. A driving method of a lighting device comprising a light source, an optical element arranged so that light emitted from the light source passes therethrough and comprising at least two liquid crystal cells overlapping each other, and a controlling device for controlling the optical element, wherein each of the at least two liquid crystal cells comprises a plurality of first electrodes and plurality of second electrodes alternately arranged in a stripe shape, a liquid crystal layer over the plurality of first electrodes and the plurality of second electrodes, and a plurality of third electrodes and plurality of fourth electrodes alternately arranged over the liquid crystal layer, intersecting the plurality of first electrodes and the plurality of second electrodes, and disposed in a stripe shape, the driving method comprising:
inputting a pulse-width modulated first input signal and second input signal to the controlling device, the first input signal and the second input signal specifying a degree of diffusion of the light caused by the optical element in an extending direction of the plurality of first electrodes and an extending direction of the plurality of third electrodes; and converting the first input signal and the second input signal into a pulse-amplitude modulated first output signal and second output signal according to duty ratios of the first input signal and the second input signal and supplying the first output signal and second output signal to the optical element.

9. The driving method according to claim 8, wherein the at least two liquid crystal cells include a first liquid crystal cell, a second liquid crystal cell, a third liquid crystal cell, and a fourth liquid crystal cell arranged in this order from a side of the light source, and the extending direction of the plurality of first electrodes of the first liquid crystal cell and the second liquid crystal cell intersects the extending direction of the plurality of the first electrodes of the third liquid crystal cell and the fourth liquid crystal cell.

10. The driving method according to claim 8, wherein the controlling device comprises a signal-converting unit, and the driving method comprises calculating the duty ratio of each of the first input signal and the second input signal with the signal-converting unit.

11. The driving method according to claim 10, wherein the signal-converting unit comprises a counter circuit, a divider circuit, a processing circuit, a filtering circuit, and a correction circuit for each of the first input signal and the second input signal, and the driving method comprises:

calculating the duty ratios with the counter circuit and the divider circuit;

performing an exception processing with the processing circuit when the duty ratios are 0 or 1;

performing filtering on the duty ratios with the filtering circuit; and determining the degree of diffusion from the duty ratios subjected to the filtering while referring to a lookup table.

12. The driving method according to claim 11, wherein the processing circuit comprises an OR circuit, a first multiplexer, and a second multiplexer, two input terminals of the OR circuit are connected to the counter circuit, and an output terminal is connected to a selection-control input terminal of the second multiplexer, two input terminals and a selection-control input terminal of the first multiplexer are connected to the counter circuit, and one output terminal of the second multiplexer is connected to the divider circuit, and the other output terminal is connected to an output terminal of the first multiplexer.

13. The driving method according to claim 8, wherein the controlling device comprises an applied-voltage calculating unit and a voltage-application unit, and the driving method comprises:

calculating amplitudes of the first output signal and the second output signal with the applied-voltage calculating unit on the basis of the degree of diffusion with respect to each of the first input signal and the second input signal and applying a voltage to the optical element with the voltage-application unit according to the amplitudes of the first input signal and the second input signal.

14. The driving method according to claim 13, wherein the voltage-application unit comprises a plurality of digital-to-analogue conversion circuits and a plurality of amplification circuits respectively connected to the plurality of first electrodes, the plurality of second electrodes, the plurality of third electrodes, and the plurality of fourth electrodes of the at least two liquid crystal cells.

* * * * *